US010764901B2

(12) United States Patent
Gupta et al.

(10) Patent No.: US 10,764,901 B2
(45) Date of Patent: Sep. 1, 2020

(54) RESOURCE ALLOCATION AND SCHEDULING FOR WIRELESS NETWORKS WITH SELF-BACKHAULED LINKS

(71) Applicant: NOKIA SOLUTIONS AND NETWORKS OY, Espoo (FI)

(72) Inventors: Richa Gupta, Bangalore (IN); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/343,397

(22) PCT Filed: Aug. 2, 2017

(86) PCT No.: PCT/EP2017/069528
§ 371 (c)(1),
(2) Date: Apr. 18, 2019

(87) PCT Pub. No.: WO2018/072905
PCT Pub. Date: Apr. 26, 2018

(65) Prior Publication Data
US 2019/0254037 A1 Aug. 15, 2019

(30) Foreign Application Priority Data
Oct. 21, 2016 (IN) .............................. 201611036116

(51) Int. Cl.
*H04W 72/00* (2009.01)
*H04W 72/04* (2009.01)
(Continued)

(52) U.S. Cl.
CPC ....... *H04W 72/0486* (2013.01); *H04L 5/0082* (2013.01); *H04W 72/04* (2013.01);
(Continued)

(58) Field of Classification Search
CPC ......... H04W 72/0486; H04W 28/0252; H04W 8/245; H04W 88/02; H04M 1/72519; H04M 1/72521; H04M 1/72522
(Continued)

(56) References Cited

U.S. PATENT DOCUMENTS

2014/0032273 A1* 1/2014 D'Angelo .............. G06Q 30/02
  705/7.35
2015/0038183 A1* 2/2015 Callard ................ H04J 11/0056
  455/501
(Continued)

OTHER PUBLICATIONS

International Search Report and Written Opinion for International Application No. PCT/EP2017/069528, dated Oct. 23, 2017, 16 pages.
(Continued)

*Primary Examiner* — Danh C Le
(74) *Attorney, Agent, or Firm* — Brake Hughes Bellermann LLP

(57) ABSTRACT

A technique is provided for allocating resources in a wireless network that includes one or more macro user devices served by a macro base station associated with a macro cell and a micro base station associated with a small cell that is served by the macro base station, including determining a portion of downlink resources allocated to a self-backhaul link between the macro base station and the micro base station for the small cell, determining that a threshold condition is exceeded with respect to the self-backhaul link for the small cell, and decreasing, based on the determining, the portion of downlink resources allocated to the self-backhaul link for the small cell.

31 Claims, 7 Drawing Sheets

(51) Int. Cl.
*H04L 5/00* (2006.01)
*H04W 88/14* (2009.01)
*H04W 28/02* (2009.01)

(52) U.S. Cl.
CPC ......... *H04W 72/042* (2013.01); *H04W 88/14* (2013.01); *H04W 28/0252* (2013.01)

(58) Field of Classification Search
USPC .................... 455/452.1, 452.2, 418; 370/329
See application file for complete search history.

(56) References Cited

U.S. PATENT DOCUMENTS

| | | | | |
|---|---|---|---|---|
| 2015/0071248 | A1* | 3/2015 | Faerber | H04W 36/0055 |
| | | | | 370/331 |
| 2015/0257024 | A1* | 9/2015 | Baid | H04W 24/10 |
| | | | | 370/338 |
| 2015/0358133 | A1* | 12/2015 | Kusashima | H04L 5/0048 |
| | | | | 370/280 |
| 2016/0198475 | A1* | 7/2016 | Uchiyama | H04W 52/38 |
| | | | | 370/329 |
| 2016/0269097 | A1 | 9/2016 | Islam et al. | |
| 2016/0366638 | A1* | 12/2016 | Kumar | H04W 52/0206 |
| 2018/0132197 | A1* | 5/2018 | Lin | H04W 52/242 |
| 2018/0234230 | A1* | 8/2018 | Kalhan | H04L 5/0044 |

OTHER PUBLICATIONS

3GPP TR 22.891 V14.0.0; 3rd Generation Partnership Project; Technical Specification Group Services and System Aspects; Feasibility Study on New Services and Markets Technology Enablers; Stage 1 (Release 14); Mar. 2016; Sophia Antipolis, France; 95 pages.
Hao et al., "Flexible Resource Allocation in 5G Ultra Dense Network with Self-backhaul"; Globecom Workshops; Dec. 6-10, 2015; San Diego, California, USA; 6 pages.
Hui et al., "Joint Routing and Resource Allocation for Wireless Self-Backhaul in an Indoor Ultra-Dense Network"; 24th Annual International Symposium on Personal, Indoor, and Mobile Radio Communications (PIMRC); Sep. 8-11, 2013; London, UK; 6 pages.

\* cited by examiner

RESOURCE ALLOCATION AND SCHEDULING FOR WIRELESS NETWORKS WITH SELF-BACKHAULED LINKS

CROSS-REFERENCE TO RELATED APPLICATIONS

This application is a national stage entry of International Application No. PCT/EP2017/069528 filed Aug. 2, 2017, entitled "RESOURCE ALLOCATION AND SCHEDULING FOR WIRELESS NETWORKS WITH SELF-BACKHAULED LINKS" which claims the benefit of priority of Indian Application No. 201611036116 filed Oct. 21, 2016, both of which are hereby incorporated by reference in their entireties.

TECHNICAL FIELD

This description relates to communications, and in particular, to a dynamic exchange of wireless communication services.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, user devices or mobile stations are referred to as user equipments (UEs). Resources are typically very limited in wireless networks.

SUMMARY

According to an example implementation, a method includes determining, allocating resources in a wireless network that includes one or more macro user devices served by a macro base station associated with a macro cell and a micro base station associated with a small cell that is served by the macro base station, the method including: determining a portion of downlink resources allocated to a self-backhaul link between the macro base station and the micro base station for the small cell; determining that a threshold condition is exceeded with respect to the self-backhaul link for the small cell; and decreasing, based on the determining, the portion of downlink resources allocated to the self-backhaul link for the small cell.

According to an example implementation, an apparatus includes at least one processor and at least one memory including computer instructions, when executed by the at least one processor, cause the apparatus to: allocate resources in a wireless network that includes one or more macro user devices served by a macro base station associated with a macro cell and a micro base station associated with a small cell that is served by the macro base station, the causing the apparatus to allocate resources includes causing the apparatus to: determine a portion of downlink resources allocated to a self-backhaul link between the macro base station and the micro base station for the small cell; determine that a threshold condition is exceeded with respect to the self-backhaul link for the small cell; and decrease, based on the determining, the portion of downlink resources allocated to the self-backhaul link for the small cell.

According to an example implementation, an apparatus includes means for allocating resources in a wireless network that includes one or more macro user devices served by a macro base station associated with a macro cell and a micro base station associated with a small cell that is served by the macro base station, the means for allocating comprising means for determining a portion of downlink resources allocated to a self-backhaul link between the macro base station and the micro base station for the small cell; means for determining that a threshold condition is exceeded with respect to the self-backhaul link for the small cell; and means for decreasing, based on the determining, the portion of downlink resources allocated to the self-backhaul link for the small cell.

According to an example implementation, a computer program product includes a non-transitory computer-readable storage medium and storing executable code that, when executed by at least one data processing apparatus, is configured to cause the at least one data processing apparatus to perform a method including: allocating resources in a wireless network that includes one or more macro user devices served by a macro base station associated with a macro cell and a micro base station associated with a small cell that is served by the macro base station, the allocating including: determining a portion of downlink resources allocated to a self-backhaul link between the macro base station and the micro base station for the small cell; determining that a threshold condition is exceeded with respect to the self-backhaul link for the small cell; and decreasing, based on the determining, the portion of downlink resources allocated to the self-backhaul link for the small cell.

The details of one or more examples of implementations are set forth in the accompanying drawings and the description below. Other features will be apparent from the description and drawings, and from the claims.

DETAILED DESCRIPTION

Figure 1:
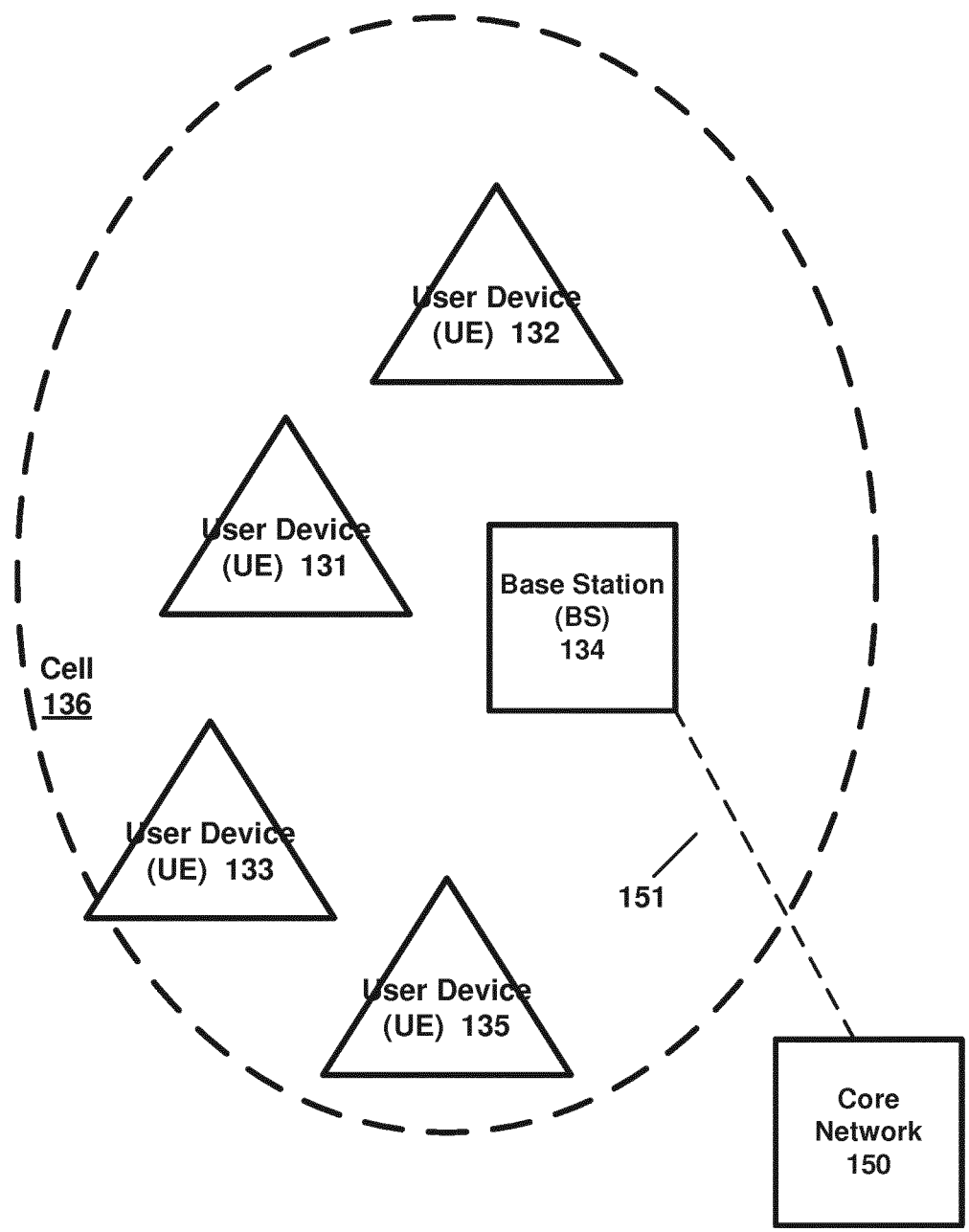
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e) Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Also, in an example implementation, a user device or UE may be a UE/user device with ultra reliable low latency communications (URLLC) applications. A cell (or cells) may include a number of user devices connected to the cell, including user devices of different types or different categories, e.g., including the categories of MTC, NB-IoT, URLLC, or other UE category.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, IoT, MTC, eMTC, URLLC, etc., or any other wireless network or wireless technology. These example networks or technologies are provided only as illustrative examples, and the various example implementations may be applied to any wireless technology/wireless network.

According to an example implementation, wireless networks may increasingly deploy small cells (or micro cells) using a base station or access point that may be referred to as a micro base station (micro BS), for example. As compared to a macro cell (e.g., provided by a macro BS), a small cell may transmit using lower power and/or may have a smaller coverage area or range. In many case, one or more small cells may overlay the coverage area of a larger macro cell. According to an example implementation, the terms macro BS and micro BS may both refer to a BS (or access point (AP) or other infrastructure node) that may include, e.g., a processor, memory, a wireless transceiver, and antenna(s) and may provide wireless services within or for one or more cells. A macro BS may provide a macro cell(s), while a micro BS may provide a small cell(s) (or micro cell(s)) that generally may have a smaller area or range as compared to the macro (or larger) cell. For example, overlaying one or more small cells over a macro cell may improve coverage and spectrum re-use.

In most networks, each BS or access point is typically connected to the core network via a wired backhaul link. However, the cost to install a wired (e.g., fiber-optic) backhaul link may be substantial. Therefore, according to an example implementation, one or more cells or BSs may be wirelessly connected to the core network. Using a portion of radio (or wireless) resources (e.g., using some of the resources of a radio access network/RAN) normally used for access links may be referred to as self-backhaul, where the term self (or self-backhaul) indicates that radio resources/wireless link provides the backhaul rather than using a traditional wired backhaul link.

According to an example implementation, in the case of self-backhaul, the radio (or wireless) resources (e.g., time-frequency resources, such as orthogonal frequency division multiplex (OFDM) symbols, physical resource blocks, or other time-frequency resources) are shared among access links and self-backhaul links. Various techniques and implementations are described herein to allocate resources and schedule these links such that the overall system performance may be improved.

Half-duplex small cells can either transmit or receive data at a given time instant, but cannot transmit and receive at the same time. This constraint raises the need to allocate resources efficiently such that the access links to the small cell user devices (small cell UEs) and the self-backhaul link to the small-cells are operated efficiently. On the other hand, full-duplex small cells can transmit and receive data simultaneously, and in some cases, may be treated or handled slightly differently in the allocation of resources, as compared to half duplex small cells.

Figure 2:
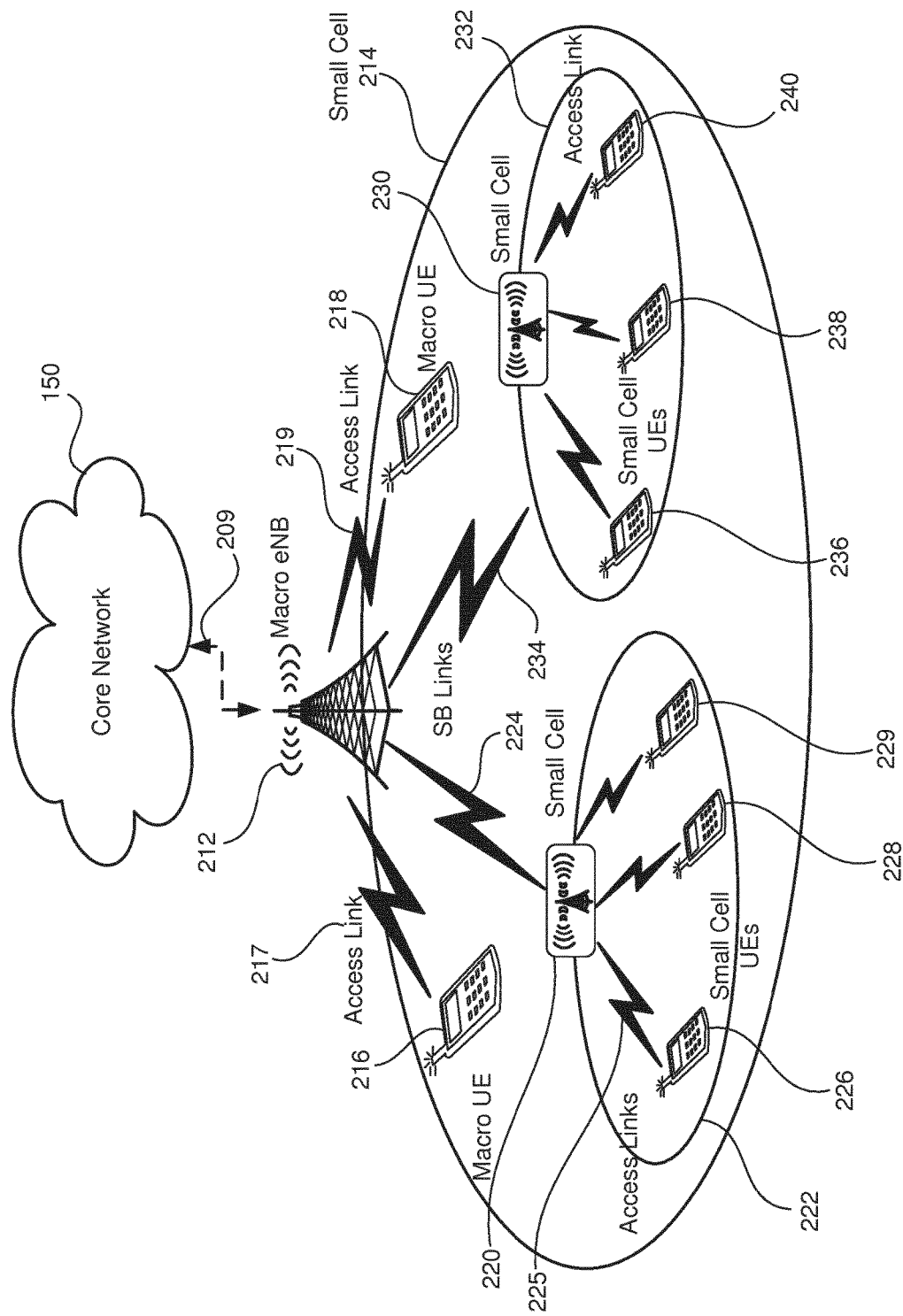
FIG. 2 is a block diagram of a wireless network according to another example implementation.

FIG. 2 is a block diagram of a wireless network according to another example implementation. A macro BS (or macro eNB) 212 is connected to a core network 150 via backhaul link 209. Macro BS 212 provides wireless services or wireless coverage within a macro cell 214. One or more additional cells (e.g., small cells or micro cells) may be provided, which may be near or which may at least partially overlap macro cell 214. For example, a micro BS 220 provides wireless services or coverage for a small (or micro) cell 222, while a micro BS 230 provides wireless services within a small cell (or micro cell) 232. Each small cell (or each micro BS that provides a small cell) may serve or provide wireless services to one or more small cell user devices (or small cell UEs). For example, micro BS 220 or small cell 222 may serve or provide wireless services to small cell user devices 226 (e.g., via access link 225), 228, and 229 via corresponding access links. Similarly, micro BS 230 or small cell 232 may serve or provide wireless services to small cells 236, 238 and 240 via corresponding access links to each small cell user device.

Macro BS (or macro eNB) 212 is connected via a backhaul link 209 (which may be wired or wireless) to core network 150. Macro BS 212 also serves or provides wireless services to one or more macro user devices/macro UEs (providing radio access services via an access link to each macro UE), and one or more small cells (providing wireless backhaul services via a self-backhaul link to each small cell). For example, macro BS 212 is in communication with a macro user device (or macro UE) 216 via access link 217, and macro user device 218 via access link 219. Macro BS 219 is also in communication with a micro BS 220 or small cell 222 via self-backhaul link 224, and is in communication with micro BS 230 or small cell 232 via self-backhaul link 234, as illustrative examples. The structure, arrangement, configuration, numbers of devices, etc., shown in FIG. 2 are provided by way of illustrative example and other networks or configurations may be used.

According to an example implementation, in some cases, the terms BS and cell may be used somewhat interchangeably, such that one or more operations indicated as being performed by a cell are or may be performed by the corresponding BS, and one or more operations being indicated as being performed by a BS may be performed by the corresponding cell. Also, in some cases, a macro BS may be the same or similar to a micro BS, e.g., each BS including a processor, memory, wireless transceiver and software, e.g., to at least provide various wireless services to user devices. A macro BS may also provide wireless services to one or more micro BSs/small cells including wireless resources and scheduling of data for a self-backhaul link for the micro BS/small cell. Also, a macro cell may, for example, provider a larger wireless coverage area as compared to a micro cell/small cell, according to an example implementation.

As noted, macro BS 212/macro cell 214 may serve or provide the following wireless services: 1) wireless access services for one or more macro user devices via access links; and 2) wireless backhaul services to one or more micro BSs or small cells via self-backhaul links between the macro BS and the micro BS/small cell. Thus, the radio or wireless resources of macro BS 212 or macro cell 214 may be shared among the access links 217, 219 associated with macro user devices 216 and 218, respectively, and one or more self-backhaul links, such as self-backhaul links 224 and 234 associated with micro BS 220/small cell 222 and micro BS 230/small cell 232, respectively. Various example techniques or implementations are described for allocating radio or wireless resources and scheduling between or among these multiple wireless links (access links and self-backhaul links).

Figure 3:
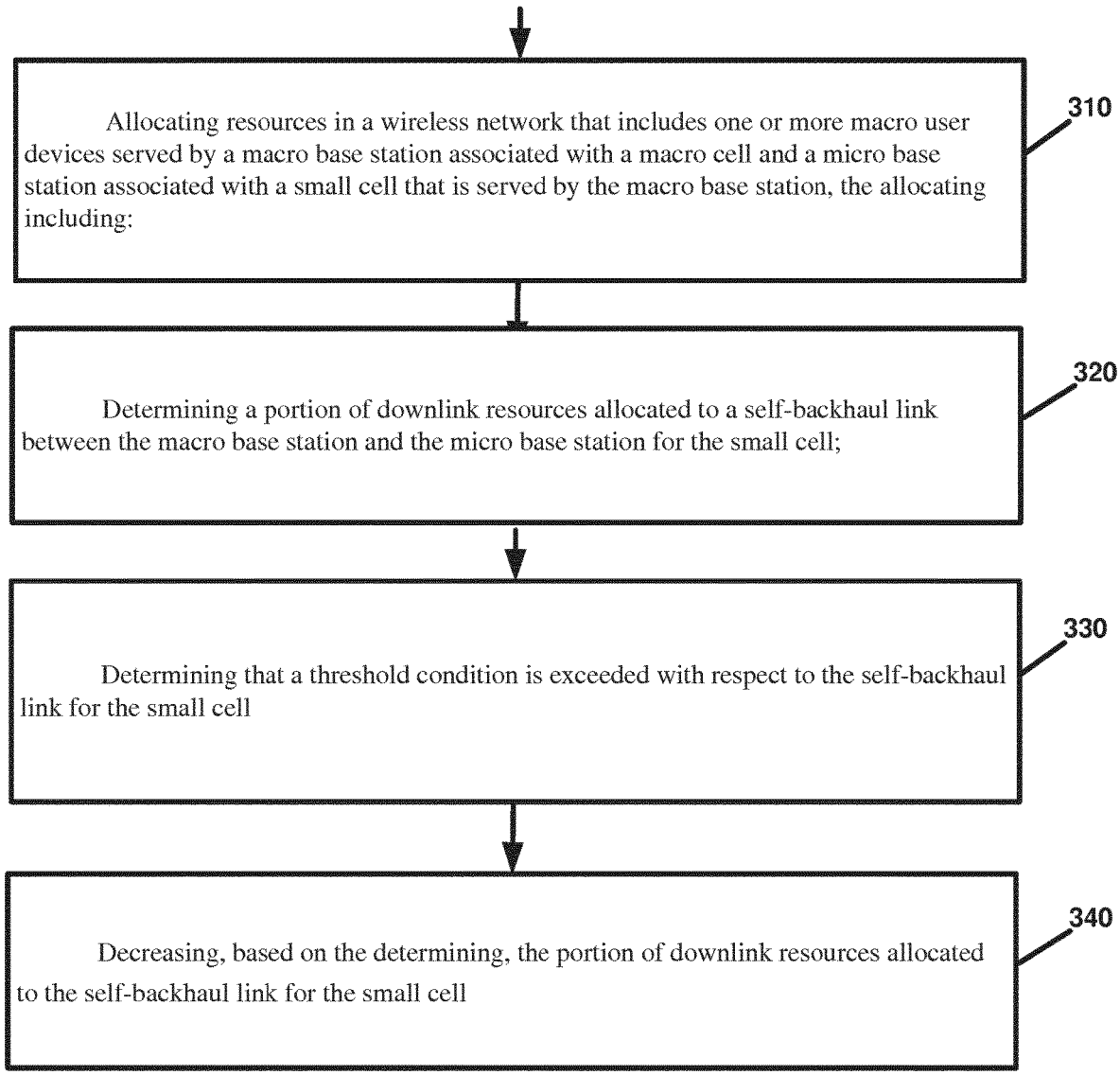
FIG. 3 is a flow chart illustrating operation of a wireless node (e.g., a BS or eNB, such as either a macro BS/eNB or a micro BS/eNB) according to an example implementation.

FIG. 3 is a flow chart illustrating operation of a wireless node (e.g., a BS or eNB, such as either a macro BS/eNB or a micro BS/eNB) according to an example implementation. Operation 310 includes allocating resources in a wireless network that includes one or more macro user devices served by a macro base station associated with a macro cell and a micro base station associated with a small cell that is served by the macro base station. For example, the allocating at operation 310 may include operations 320, 330 and 340. Operation 320 includes determining a portion of downlink resources allocated to a self-backhaul link between the macro base station and the micro base station for the small cell. Operation 330 includes determining that a threshold condition is exceeded with respect to the self-backhaul link for the small cell. Operation 340 includes decreasing, based on the determining, the portion of downlink resources allocated to the self-backhaul link for the small cell. In illustrative example implementations, the operations of the flow chart of FIG. 3 may be performed by a macro BS or a micro BS; by a full duplex or half duplex cell or BS (e.g., small cell or micro BS); and for either a centralized mode (e.g., performed by a macro BS) or a distributed mode (e.g., in which at least a portion of the operations of FIG. 3 may be performed by each of one or more small cells or micro BSs).

According to an example implementation of the method of FIG. 3, the determining a portion of downlink resources allocated to a self-backhaul may include: determining, by the macro base station, a portion of downlink resources allocated to a self-backhaul link between the macro base station and the micro base station for the small cell based on a number of small cell user devices served by the small cell.

According to an example implementation of the method of FIG. 3, the determining a portion of downlink resources allocated to a self-backhaul link may include: receiving, by a micro base station associated with the small cell from the macro base station, information indicating the portion of downlink resources allocated to the self-backhaul link between the macro base station and micro base station for the small cell.

According to an example implementation of the method of FIG. 3, the determining a portion of downlink resources allocated to a self-backhaul link may include determining, a portion of downlink resources allocated to a self-backhaul link for the small cell in a weighted proportion to the number of small cell user devices served by the small cell.

According to an example implementation of the method of FIG. 3, the determining a portion of downlink resources allocated to a self-backhaul link may include determining a portion of downlink resources allocated to user devices based on a number of user devices served by or over each of a plurality of wireless links, including: determining, by the macro base station, a portion of downlink resources allocated to an access link for each of one or more macro user devices; and determining, by the macro base station, a portion of downlink resources allocated to a self-backhaul link for the small cell in a weighted proportion to the number of small cell user devices served by the micro base station for the small cell.

According to an example implementation of the method of FIG. 3, the determining that a threshold condition is exceeded comprises: determining that a sum of ratios of: 1) a data rate for the self-backhaul link for the small cell to 2) a data rate of an access link between the small cell and each of one or more small cell user devices served by the small cell, is greater than a threshold.

According to an example implementation of the method of FIG. 3, the small cell includes a first small cell, and wherein each of a plurality of small cells, including the first small cell, is served by the macro base station via a self-backhaul link between the small cell and the macro base station, and wherein the threshold includes a sum of: 1) a number of all macro user devices served by a macro base station, and 2) a number of small cell user devices served by each of the plurality of small cells other than the first small cell.

According to an example implementation of the method of FIG. 3, the small cell includes a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells.

According to an example implementation of the method of FIG. 3, the decreasing may include: decreasing, by the macro base station, based on the determining, the portion of downlink resources allocated to the self-backhaul link for the small cell which frees up some of the resources that were allocated to the small cell; determining, by the macro base station, a portion of the freed up resources to be re-allocated to at least one of: an access link for one or more macro user devices served by the macro base station; and a self-backhaul link for one or more other small cells served by the macro base station.

According to an example implementation of the method of FIG. 3, the small cell comprises a first small cell, and wherein the determining a portion of downlink resources allocated to a self-backhaul link for a small cell includes: determining a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link.

According to an example implementation of the method of FIG. 3, the small cell includes a first small cell, wherein the determining a portion of downlink resources allocated to a self-backhaul link for the first small cell includes: receiving, by a macro base station from each of a plurality of small cells including the first small cell, a number of small cell user devices served by the small cell; determining a number of macro user devices served by the macro base station; and determining a portion of downlink resources allocated to a self-backhaul link for the first small cell based on the number of small cell user devices served by the first small cell, the number of small cell user devices served by all small cells that receive resources from the macro base stations, and the number of macro user devices served by the macro base station.

According to an example implementation of the method of FIG. 3, the small cell schedules an amount of data equally to each small cell user device that is served by the small cell.

According to an example implementation of the method of FIG. 3, the method may further include communicating, by the macro base station to the small cell, the portion of downlink resources allocated to the small cell.

According to an example implementation of the method of FIG. 3, the method may further include: communicating, by the macro base station, data to the micro base station for a small cell user device via the resources allocated to the self-backhaul link for the small cell.

According to an example implementation of the method of FIG. 3, the method further including receiving, by the micro base station for the small cell from the macro base station, data bits via the resources allocated for the self-backhaul link for the small cell; and allocating, by the micro base station for the small cell, data bits equally among the small cell user devices served by the small cell.

According to an example implementation of the method of FIG. 3, the method further includes determining a target throughput per small cell user device for the small cell; receiving, by the macro base station from the micro base station for the small cell, an actual throughput for each of a plurality of the small cell user devices served by the small cell; selecting, by the macro base station based on the actual throughput for the small cell user devices, one of the small cell user devices that has been served the least based on its actual throughput with respect to the target throughput per small cell user device; scheduling, by the macro base station for a subframe or transmission time interval (TTI), when the self-backhaul link for the small cell is scheduled, the selected small cell user device for downlink data transmission.

According to an example implementation of the method of FIG. 3, the method further including determining a target resource allocation for each of a plurality of links including one or more access links and the self-backhaul link; determining a portion of downlink resources allocated to an access link for each of one or more macro user devices; and determining which link, of the one or more access links and the self-backhaul link, has been served the least with respect to its target resource allocation; and, scheduling, by the macro base station for a subframe or transmission time interval (TTI), the link that has been served the least with respect to its target resource allocation for downlink data transmission.

According to an example implementation of the method of FIG. 3, the method further including determining a target resource allocation for each of a plurality of small cell user devices served by the small cell, determining a portion of downlink resources allocated to each of a plurality of access links associated with a small cell user device served by the small cell; and determining which access link of the plurality of access links for small cell user devices served by the small cell, has been served the least with respect to its target resource allocation; and scheduling, for a subframe or transmission time interval (TTI) when the self-backhaul link for the small cell is scheduled, the access link that has been served the least with respect to its target resource allocation, for downlink data transmission.

According to an example implementation of the method of FIG. 3, the small cell includes a first small cell, wherein the determining a portion of downlink resources allocated to a self-backhaul link for the first small cell comprises: receiving, by the macro base station from each of a plurality of small cells including the first small cell, a number of small cell user devices for each of a plurality of small cells including the first small cell; determining a channel state information for an access link between the macro base station and each of a plurality of macro user devices; determining a channel state information of a self-backhaul link between the macro base station and a micro base station for each of the plurality of small cells; receiving, from the small cell, channel state information of an access link for one or more small cell user devices; and determining a portion of downlink resources allocated to a self-backhaul link for the first small cell based on at least a portion of the number of small cell user devices served by the first small cell and the channel state information.

According to an example implementation of the method of FIG. 3, the small cell includes a first small cell, wherein the determining a portion of downlink resources allocated to a self-backhaul link for the first small cell includes: receiving, by the macro base station from each of a plurality of small cells including the first small cell, a number of small cell user devices for each of a plurality of small cells including the first small cell; and determining a portion of downlink resources allocated to a self-backhaul link for the first small cell based on the number of small cell user devices served by the first small cell and the number of small cell user devices served by one or more other small cells.

According to an example implementation of the method of FIG. 3, the method may further include receiving, by the macro base station from the small cell, an indication of an amount of data buffered at the small cell for each of one or more small cell user devices served by the small cell; determining the small cell user device that has the least amount of buffered data at the small cell; and scheduling for downlink data transmission, by the macro base station for a subframe or transmission time interval (TTI) when the self-backhaul link for the small cell is scheduled, the small cell user device that has the least amount of buffered data at the small cell.

According to an example implementation, an apparatus includes least one processor and at least one memory including computer instructions, when executed by the at least one processor, cause the apparatus to: allocate resources in a wireless network that includes one or more macro user devices served by a macro base station associated with a macro cell and a micro base station associated with a small cell that is served by the macro base station, wherein causing the apparatus to allocate includes causing the apparatus to: determine a portion of downlink resources allocated to a self-backhaul link between the macro base station and the micro base station for the small cell; determine that a threshold condition is exceeded with respect to the self-backhaul link for the small cell; and decrease, based on the determining, the portion of downlink resources allocated to the self-backhaul link for the small cell.

Further example details are described for a number of illustrative example implementations. The term macro BS may be used interchangeably with the term macro eNB, and the term user device may be used interchangeably with the term UE.

According to an example implementation, macro BS (macro eNB) 212 serves M macro user devices (UEs) on the access link and S small cells on the self-backhaul links. A small cell k serves $N_k$ small cell UEs. An example goal here is to determine optimal (or at least a target) resource allocation for all the links such that the sum-log utility of the users' throughput is maximized (or at least improved), e.g., satisfying the given constraints. According to an example implementation, the objective function may be described for half-duplex and full-duplex small cells separately as the conditions for these two cases differ, for example. The problem formulation may, for example, be based on given UE SINR (Signal to interference plus noise ratio) distribution or UE achieved data rates. According to an example implementation, the solution may provide the fraction or portion of time-frequency resources that each link should receive.

Network with Full-Duplex Small Cells

According to an illustrative example implementation, in order to achieve optimal (or at least improved) system performance, the objective function (1) is defined as the maximization of the logarithm of user throughput i.e.

$$\max_{\rho_i, \rho_j^k, \rho_k} \left\{ \sum_{i=1}^{M} \log(\rho_i R_i) + \sum_{k=1}^{S} \sum_{j=1}^{N_k} \log(\rho_j^k R_j^k) \right\} \quad (1)$$

subject to $$0 \leq \rho_i \leq 1 \, \forall \, i = 1, \ldots, M \quad (1a)$$

-continued $$0 \leq \rho_j^k \leq 1 \, \forall \, j = 1, \ldots, N_k, \forall \, k = 1, \ldots, S \quad (1b)$$

$$0 \leq \rho_k^{sc} \leq 1 \, \forall \, k = 1, \ldots, S \quad (1c)$$

$$\sum_{i=1}^{M} \rho_i + \sum_{k=1}^{S} \rho_k^{sc} \leq 1 \quad (1d)$$

$$\sum_{j=1}^{N_k} \rho_j^k R_j^k \leq \rho_k^{sc} R_k^{sc} \forall \, k = 1, \ldots, S \quad (1e)$$

$$\sum_{j=1}^{N_k} \rho_j^k \leq 1 \, \forall \, k = 1, \ldots, S \quad (1f)$$

Here $\rho_i$, $\rho_j^k$, $\rho_k^{sc}$ are the fraction (or portion) of radio/wireless (e.g., time-frequency) resources allocated to macro UE i, small cell UE j in small cell k, and the self-backhaul link to small cell k, respectively. Conditions 1a, 1b, 1c specify that the fraction of resources cannot be less than 0 and cannot exceed the maximum available resources (e.g., 1).

Condition 1d specifies that the aggregate fraction (or portion) of resources used by the macro eNB cannot exceed 1. This constraint should preferably be met with equality at the optimal (or target) operating point. Flow conservation constraint (1e) specifies that the small cell cannot or should not send traffic (to its small cell UEs) more than what it received from the macro eNB (over its self-backhaul link). It can be shown that this constraint should preferably be met with equality. Otherwise, the utility can be increased by using the remaining resources to serve the macro UEs. It may be assumed that the rates R (data rates) account for the interference impact due to full-duplex transmission. Condition (1f) specifies that the aggregate of the fraction of resources used by any small cell cannot exceed 1.

Function (1) is convex with linear constraints. Solving (1) may not necessarily give closed form expression in all cases. For example, the optimal operating point (or preferred allocation of resources) is indicated by 1A, 1B, 1C may be achievable, for example, if the following condition (1D) holds for small cell k:

$$\sum_{j=1}^{N_k} \frac{R_k^{sc}}{R_j^k} \leq M + \sum_{l=1}^{S} N_l \quad (1D)$$

According to an example implementation, the target or ideal operating point described in 1A, 1B and 1C below describes a target allocation of wireless/radio resources of macro cell 214 or macro eNB/BS 212 to various links, including: a portion of resources allocated to macro UE i (indicated 1A), a portion of resources allocated to small cell (sc) k (indicated by 1 B), and a portion of resources allocated to small cell UE j within small cell k.

Thus, in an example implementation, the preferred or target (e.g., ideal) allocation of resources or operating point may be achieved via 1A, 1B and 1C if the threshold condition of 1D is met or satisfied, for example. The threshold condition of 1D indicates or defines a threshold condition for the data rates (e.g., ratio of data rates) with respect to small cell k. As shown above in 1D, according to an example implementation, the threshold condition of 1D, when met, requires that a sum of ratios of: 1) a data rate ($R_k^{sc}$) for the self-backhaul link for the small cell to 2) a data rate (e.g., sum of $R_j^k$) of an access link between the small cell and each of one or more small cell user devices served by the small cell, to be less than or equal to a threshold (where the threshold in this case is M+ sum of $N_i$, where M is number of macro UEs served by macro eNB, and Ni is the number of small cell user devices for all small cells served by macro eNB). If the sum of ratios of the data rates for the small cell, per 1 D, is greater than the threshold, then the threshold condition is exceeded with respect to the self-backhaul link, and resources allocated to the self-backhaul link for the small cell should be reduced.

For example, with respect to threshold condition of 1D, the small cell may be a first small cell, and wherein each of a plurality of small cells, including the first small cell, may be served by the macro base station (or macro eNB) via a self-backhaul link between the small cell and the macro base station, and wherein the threshold may include a sum of: 1) a number (M) of all macro user devices (macro UEs) served by the macro base station, and 2) a number of small cell user devices served by each (or all) of the plurality of small cells that are served by the macro eNB/macro BS. Thus, in another example implementation, threshold condition 1D may require that the ratio of the data rates (or sum of ratios of the data rates) of the self-backhaul link for the small cell with respect to the data rates of the access links of the small cell are less than or equal to the total number of user devices/UEs (including both macro UEs and small cell UEs of the small cell) served by the macro eNB/macro BS.

Thus, for example, this threshold condition of 1D, when met or satisfied by a small cell, helps ensure that the data transmitted over the self-backhaul link from the macro eNB to the small cell does not overwhelm the access links of the small cell, which would result in excessive buffering of data at the small cell to be forwarded, and which may be an inefficient use (or even a waste) of wireless resources of the macro cell/macro eNB. For example, if the threshold condition of 1D is not met for a full duplex small cell, then the portion of resources allocated to the self-backhaul link for this small cell may then be reduced (which may free up a portion of resources that had been allocated to the self-backhaul link of the small cell), and the freed up resources may then be re-allocated by the macro eNB/macro BS to self-backhaul links of other small cells that are served by the macro cell/macro eNB and/or to access links of one or more macro UEs that are served by the macro eNB or macro cell.

$$\rho_i = \frac{1}{M + \sum_{k=1}^{S} N_k} \forall i = 1, \ldots, M \quad (1A)$$

$$\rho_k^{sc} = \frac{N_k}{M + \sum_{k=1}^{S} N_k} \forall k = 1, \ldots, S \quad (1B)$$

$$\rho_j^k = \frac{R_k^{sc}}{\left(M + \sum_{l=1}^{S} N_l\right) R_j^k} \forall j = 1, \ldots, N_k, \forall k = 1, \ldots, S \quad (1C)$$

1B indicates that resources are allocated to the self-backhaul link for the small cell k in a weighted proportion of the number (e.g., $N_k$) of small cell UEs that this small cell has to serve. Equation 1C implies or indicates that $\rho_j^k R_j^k$ is a constant for a given small cell k. Thus, a target or preferred or optimal solution may be such that the macro BS/macro eNB may provides an equal share of resources to its UEs and the small cell (assuming the small cell is equivalent to $N_k$ UEs). However, in an example implementation, the small cell may divide resources among its (small cell) UEs such that each small cell UE may receive the same number of bits.

For the case where condition (1D) is not satisfied for a small cell k, resource allocation as per (1A), (1B), (1C) violates the constraint (1f). The resources for self-backhaul link should be scaled down or reduced from this allocation in such cases, in order to meet flow conservation constraint and constraint (1f). According to an example implementation, a heuristic solution may be used in this case by estimating the fraction or portion of resources needed for the small cells at the above operating point and then reducing it until constraint 1f is met First determine the resources using equations (1A), (16), and (1C) assuming condition (1D) holds Second step is to scale down or reduce the fraction of resources allocated to the self-backhaul link of those small cells $K \subseteq \{1, 2, \ldots, S\}$ that violate the constraint (1f) such that this constraint is met with equality, i.e., $$\rho_j^{k'} = \frac{\rho_j^k}{\sum_{j=1}^{N_k} \rho_j^k} \forall k \in \text{Small cells } K \quad (1E)$$

$$\rho_k^{sc'} = \frac{\sum_{j=1}^{N_k} \rho_j^k R_j^k}{R_k^{sc}} \forall k \in \text{Small cells } K \quad (1F)$$

In 1E, the reduced allocated portion of resources is determined for the small cell UE j in small cell k. The resources left-over or freed up after re-computing $\rho_k^{sc'}$ (the reduced portion of resources allocated to self-backhaul link for small cell k) in 1F, may be distributed, e.g., by macro eNB, among the macro UEs and the remaining self-backhaul links with inactive constraint (1f), i.e.

$$\rho_i' = \frac{M\rho_i + \sum_{\substack{k=1 \\ k \notin K}}^{S} \rho_k^{sc} + \sum_{k \in K} \left(\rho_k^{sc} - \rho_k^{sc'}\right)}{M + \sum_{\substack{k=1 \\ k \notin K}}^{S} N_k} \forall i \in \text{Macro } UEs \quad (1G)$$

$$\rho_1^{sc'} = N_l \rho_l' \forall l = 1, \ldots S, l \notin K \quad (1H)$$

Thus, 1G indicates one technique in which at least a portion of the freed up resources may added to the resources allocated to macro UE i, where the parenthetical term in numerator of 1G is the freed up resources from reducing the resources allocated to the self-backhaul link for the small cell k. 1H indicates that the resources allocated to other small cells are also increased, e.g., based on the parenthetical term in the numerator of 1G. It can be shown that the above determined allocation in second step (1E) meets the constraint (1f) with equality for cell k, i.e. $\Sigma_{j=1}^{N_k} \rho_j^{k'} = 1$ If as a result of (1H), a different small cell(s) fails to satisfy condition (1D), then execute the above procedure again for such small cells The reason to do this is that when condition (1D) is not met, there is no closed-form expressions for the p (resource allocation(s)). An exhaustive search may be to obtain the optimal solution in this case. Such search techniques are not practical for scheduler operation, and therefore, the solution described above may be used instead to decrease the resources allocated to the self-backhaul link.

Network with Half-Duplex Small Cells

The operation with respect to half-duplex small cells is very similar to operation with respect to full-duplex (FD) cells, but there is a different constraint for half-duplex (HD) cells because HD cells can either transmit or receive, but not both at the same time.

The objective function for networks with self-backhaul links for half-duplex small cells to maximize system utility is defined as $$\max_{\rho_i, \rho_j^k, \rho_k} \left\{ \sum_{i=1}^{M} \log(\rho_i R_i) + \sum_{k=1}^{S} \sum_{j=1}^{N_k} \log(\rho_j^k R_j^k) \right\} \quad (2)$$

subject to $$0 \leq \rho_i \leq 1 \; \forall \; i = 1, \ldots, M \quad (2a)$$

$$0 \leq \rho_j^k \leq 1 \; \forall \; j = 1, \ldots, N_k, \forall \; k = 1, \ldots, S \quad (2b)$$

$$0 \leq \rho_k^{sc} \leq 1 \; \forall \; k = 1, \ldots, S \quad (2c)$$

$$\sum_{i=1}^{M} \rho_i + \sum_{k=1}^{S} \rho_k^{sc} \leq 1 \quad (2d)$$

$$\sum_{j=1}^{N_k} \rho_j^k \leq 1 - \rho_k^{sc} \; \forall \; k = 1, \ldots, S \quad (2e)$$

$$\sum_{j=1}^{N_k} \rho_j^k R_j^k \leq \rho_k^{sc} R_k^{sc} \; \forall \; k = 1, \ldots, S \quad (2f)$$

The objective function for half-duplex small cell is same as that for full-duplex small cell except having a different constraint (2e) for half-duplex limitation of the small cell. Half-duplex constraint (2e) for a small cell k means that the sum of the fraction or portion of resources the small cell k is transmitting ($\rho_j^k$, which are the resources allocated to access link for small cell UE j for small cell k) and the fraction of resources it is receiving via downlink resources from macro eNB ($\rho_k^{sc}$, which are the resources allocated to the backhaul link for small cell k) cannot exceed 1.

Solving (2) does not give close form expression in all cases. Also, the optimal or target operating point 1A, 1B, 1C is possible if following condition holds for small cell k (for half duplex small cells):

$$\sum_{j=1}^{N_k} \frac{R_k^{sc}}{R_j^k} \leq M + \sum_{\substack{l=1 \\ l \neq k}}^{S} N_l \quad (2A)$$

For the case where condition (2A) is not satisfied for a small cell k, resource allocation as per (1A), (16), (1C) violates the half-duplex constraint (2e). The resources allocated to the self-backhaul link should be scaled down or reduced from this allocation in such cases, in order to meet flow conservation constraint and half-duplex constraint (2e).

Thus, in an example implementation, the preferred or target (e.g., ideal) allocation of resources or operating point may be achieved via 1A, 16 and 1C if the threshold condition of 2A (for half duplex cells) is met or satisfied, for example. The threshold condition of 2A indicates or defines a threshold condition for the data rates (e.g., ratio of data rates) with respect to small cell k. As shown above in 1D, according to an example implementation, the threshold condition of 2A, when met, requires that a sum of ratios of: 1) a data rate ($R_k^{sc}$) for the self-backhaul link for the small cell to 2) a data rate (e.g., sum of $R_j^k$) of an access link between the small cell and each of one or more small cell user devices served by the small cell, to be less than or equal to a threshold (where the threshold in this case is M+ sum of $N_l$, where M is number of macro UEs served by macro eNB, and $N_l$ is the number of small cell user devices for all small cells served by macro eNB, except the small cell UEs of this small cell). Thus, as a difference with respect to condition of 1D (for full duplex small cells) the threshold in 2A omits, or does not include, the number of small cell UEs of this small cell k. If the sum of ratios of the data rates for the small cell, per 2A, is greater than the threshold, then the threshold condition is exceeded with respect to the self-backhaul link, and resources allocated to the self-backhaul link for the small cell should be reduced.

For example, with respect to threshold condition of 2A, the small cell may be a first small cell, and wherein each of a plurality of small cells, including the first small cell, may be served by the macro base station (or macro eNB) via a self-backhaul link between the small cell and the macro base station, and wherein the threshold may include a sum of: 1) a number (M) of all macro user devices (macro UEs) served by the macro base station, and 2) a number of small cell user devices served by each (or all) of the plurality small cells that are served by the macro eNB/macro BS other than the first small cell (because this is for half duplex small cell). Thus, in another example implementation, threshold condition 2A may require that the ratio of the data rates (or sum of ratios of the data rates) of the self-backhaul link for the small cell with respect to the data rates of the access links of the small cell are less than or equal to the total number of user devices/UEs (including both macro UEs and small cell UEs of other small cells, not including this small cell) served by the macro eNB/macro BS.

Thus, for example, this threshold condition of 2A (for half duplex small cells), when met or satisfied by a small cell, helps ensure that the data transmitted over the self-backhaul link from the macro eNB to the small cell does not overwhelm the access links of the small cell, which may waste wireless resources of the macro cell/macro eNB. For example, if the threshold condition of 2A is not met for a half duplex small cell, then the portion of resources allocated to the self-backhaul link for this small cell may then be reduced (which may free up a portion of resources that had been allocated to the self-backhaul link of the small cell), and the freed up resources may then be re-allocated by the macro eNB/macro BS to self-backhaul links of other small cells that are served by the macro cell/macro eNB and/or to access links of one or more macro UEs that are served by the macro eNB or macro cell.

According to an example implementation, a heuristic solution for this case may be provided by estimating the fraction of resources needed for the small cells at the above operating point and then reducing it till the half duplex constraint is met First determine the resources using equations (1A), (16), and (1C) assuming condition (2A) holds Second step is to scale down or reduce the fraction of resources for the K⊆{1, 2, . . . , S} self-backhaul link of those small cells that violate the half duplex constraint such that the half-duplex constraint is met with equality, i.e., $$\rho_k^{sc'} = \frac{\rho_k^{sc}}{\rho_k^{sc} + \sum_{j=1}^{N_k} \rho_j^k} \forall k \in \text{Small cells } K \quad (2B)$$

$$\rho_j^{k'} = \frac{\rho_k^{sc'} R_k^{sc}}{N_k R_j^k} \forall j = 1, \ldots, N_k, \forall k \in \text{small cells } K \quad (2C)$$

The resources left-over after re-computing $\rho_k^{sc}$ are distributed among the macro UEs and the remaining self-backhaul links with inactive half-duplex constraint, computation is same as given in (1G) and (1H).

It can be verified that the above determined allocation in second step meets the half duplex constraint with equality for cell k, i.e. $\Sigma_{j=1}^{N_k} \rho_k^{k'} + \rho_k^{sc'} = 1$ If as a result of (1H), a different small cell(s) fails to satisfy condition (2A), then the above procedure may be executed or performed again for such small cells According to an example implementation, the above solution(s) for allocating resources, comparing data rates of a small cell to a threshold, and the reducing/decreasing the resources allocated to a self-backhaul link if the threshold condition is exceeded may be used for long-term resource allocation, e.g., to determine resource allocations for multiple transmission time intervals (TTIs) or subframes. These techniques may also be used to allocate resources and/or schedule data for transmission via the resources on a per TTI or per subframe bases, for example. These illustrative techniques may be applied for either a centralized approach or a distributed approach.

Centralized Solution for Network with Half-Duplex or Full-Duplex Small Cells

According to an example implementation, some or all of the following information may be used for centralized resource allocation performed at a central entity, such as, the macro eNB The number of UEs attached to each of the small cells Channel knowledge of small cell users Channel state information of the self-backhaul link to a small cell, and channel state information of an access link to each macro UE Throughput of the small cell UEs The macro eNB can determine the resource allocation using the above.

Distributed Solution for Network with Half-Duplex or Full-Duplex Small cells

In a distributed solution, each macro eNB allocates resources among its macro UEs and the self-backhaul links that the macro eNB serves. The macro eNB has channel knowledge of its macro UEs and the self-backhaul links but does not have any channel knowledge of small cell UEs that are being served by small cells. In an illustrative example implementation, the macro eNB may allocate resources based on the load information from each small cell. The number of UEs served by a small cell is reported as the load information. Macro eNB uses this information to determine the optimum or target resource allocation among macro UEs and self-backhaul links as given in (1A), (16).

According to an example implementation, a small cell may schedule data to its UEs by distributing the bits received on self-backhaul link equally among its UEs (equal throughput scheduler). The macro eNB may distribute its bits equally amongst the small cell UEs when it transmits data to the small cell on the self-backhaul link. If $T_k$ is the throughput on the self-backhaul link to small cell k, then the fraction or portion of resources that a UE (small cell UE) of small cell k will be allocated is:

$$\rho_j^k = \frac{T_k}{R_j^k N_k} \quad (3A)$$

In 3A, $R_j^k$ is the rate of small cell UE j being served by small cell k, $N_k$ is the number of UEs served by small cell k.

Figure 4:
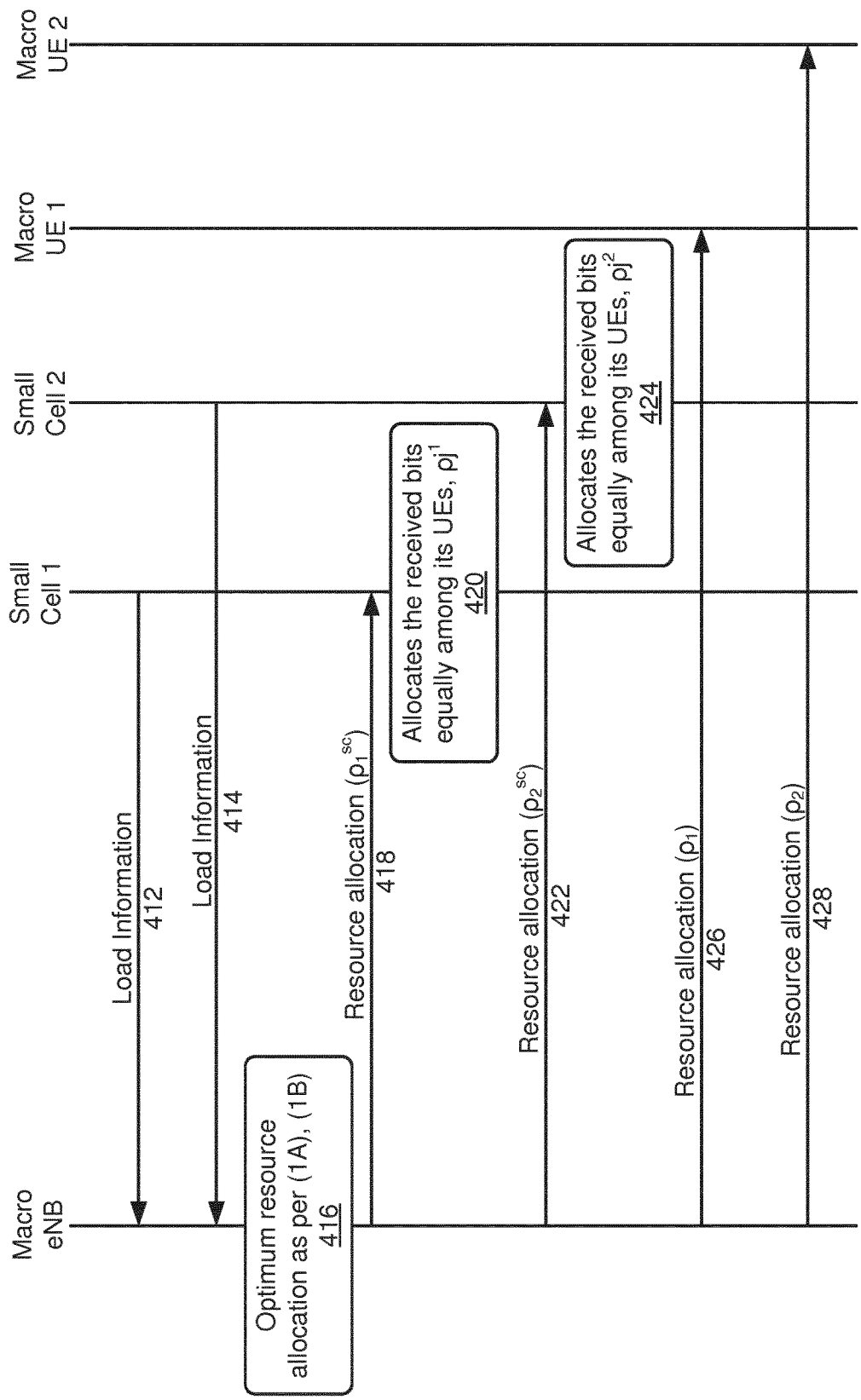
FIGS. 4-5 are diagrams illustrating operation of a wireless network for a distributed approach according to an example implementation.
Figure 5:
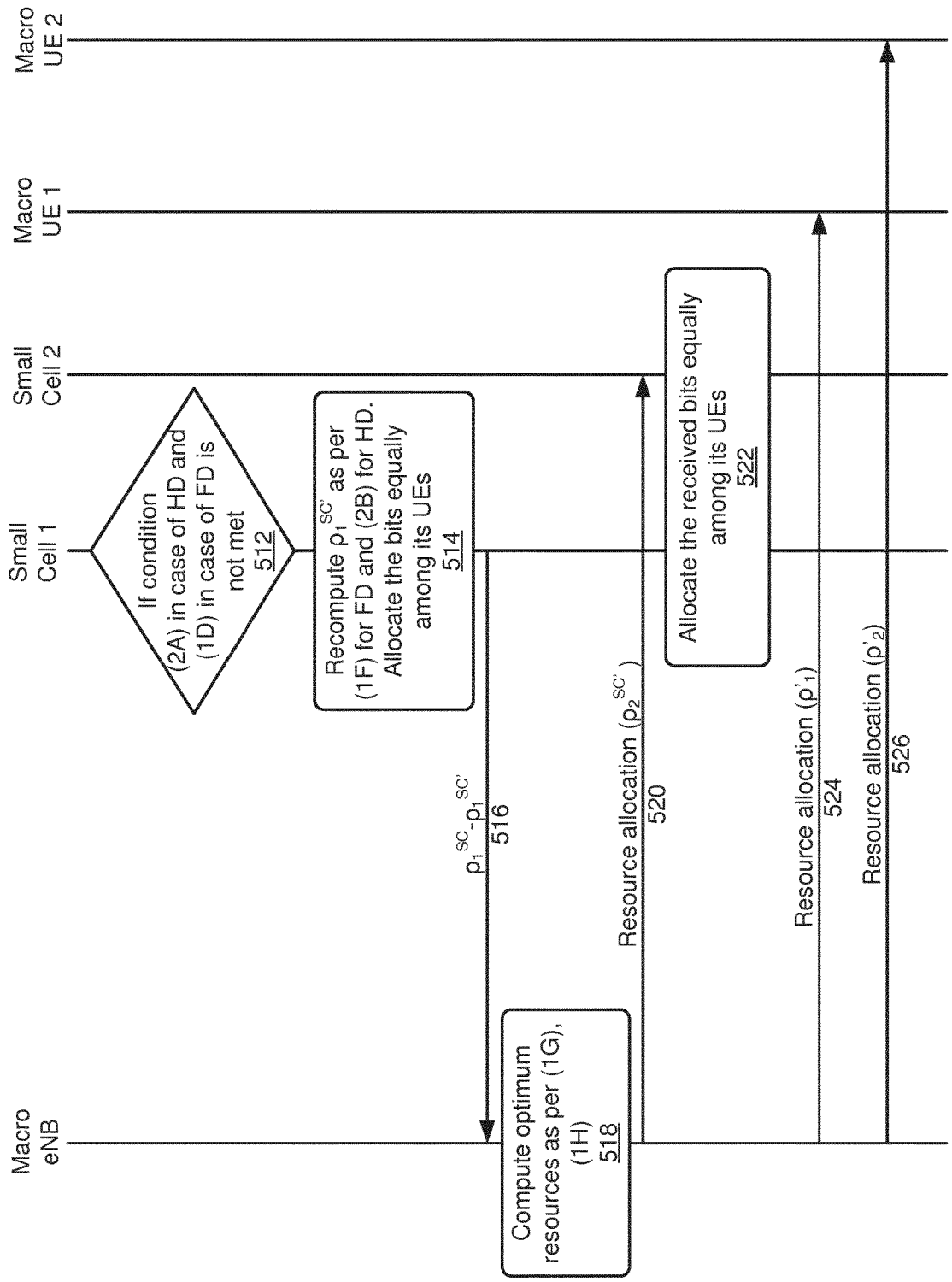

FIGS. 4-5 are diagrams illustrating operation of a wireless network for a distributed approach according to an example implementation. In the example approach or solution shown in FIGS. 4-5, a macro eNB determines an initial allocation of resources (e.g., among macro UEs and small cells served by the macro eNB), and each small cell may then determine a reduced amount of resources to be allocated to a self-backhaul link for the small cell if a threshold condition for the self-backhaul link is exceeded, for example.

As shown in FIG. 4, a macro eNB may serve small cell 1 and small cell 2 via corresponding access links, and may serve macro UE 1 and macro UE 2 via corresponding self-backhaul links. Although not shown in FIGS. 4-5, each small cell may also serve one or more small cell UEs. Thus, for example, macro eNB may allocate a portion of downlink resources for each link served by the macro eNB (e.g., to each access link and each self-backhaul link), e.g., based on (e.g., in proportion to) the number of UEs served by the link as compared to the total number of UEs served by the macro eNB.

Referring to FIG. 4, at 412 and 414, macro eNB may receive load information (e.g., number of small cells served by each small cell) from each of small cell 1 and small cell 2. At 416, macro eNB may determine a portion of downlink resources to be allocated to each of one or more links served by the macro eNB, e.g., including determining a portion of downlink resources to be allocated to small cell 1, small cell 2, macro UE 1, and macro UE2, as examples.

At 418 and 422, macro eNB communicates or sends messages to small cells 1 and 2, to indicate the portion or downlink resources allocated to (or the resource allocation for) small cell 1 and small cell 2, respectively. At 420 and 424, according to an example implementation, small cell 1 and small cell 2 may allocate the received bits equally among its small cell UEs. Also, at 426 and 428, macro eNB communicates or sends a message to macro UE 1 and macro UE 2 to indicate the portion of downlink resources allocated to macro UE 1 and macro UE 2, respectively.

FIG. 5 is a continuation of the operation of FIG. 4. At 512, small cell 1 determines if a threshold condition for its self-backhaul link is exceeded (e.g., determines if condition 2A is not met for half duplex small cell, or condition 1D is not met for full duplex small cell). If the threshold condition for the self-backhaul link is not met or is exceeded, this indicates that the portion of resources allocated to the self-backhaul link for the small cell should be decreased or reduced. Therefore, at 514, small cell 1 may then recomputes or determines an updated (decreased) amount/portion of downlink resources to be allocated to small cell 1 (e.g., based on 1F for full duplex small cell, or based on 2B for half duplex small cell), and small cell 1 may allocate received bits equally among its served small cell UEs, for example. Each of the other small cells may likewise perform operations 512 and 514.

By determining a reduced or decreased amount of resources to be allocated to the self-backhaul link for small cell 1, this may free up some resources that had previously been allocated to small cell 1, but are now available for redistribution to other links. Thus, at 516, small cell 1 communicates to macro eNB the portion or amount of resources that have been freed up or are available for redistribution. At 518, macro eNB determines an updated allocation of resources for other self-backhaul links and access links for macro UEs (small cell 1 already knows its updated/decreased allocation of resources based on its determination at 514). At 520, macro eNB informs small cell 2 of the updated portion of resources allocated to self-backhaul link for small cell 2. At 522, for example, small cell 1 and small cell 2 may each allocate the received bits from macro eNB equally among its small cell UEs. At 524 and 526, macro eNB informs macro UE 1 and macro UE 2 of the updated portion of downlink resources allocated to UE 1 and UE 2, respectively.

Note that for a more centralized approach, macro eNB may perform operations 512 and 514 for each of one or more small cells, and then communicate the updated/decreased allocation of resources to each small cell/all small cells (including the small cell that exceeded the threshold condition at 512).

Thus, according to an example implementation, the solution illustrated in FIGS. 4-5 as per (1A), (16) may describe target or optimum resource allocation for full-duplex self-backhauled networks and for half-duplex self-backhauled networks if condition (2A) is satisfied. If condition (2A) is not satisfied for half-duplex small cell networks then use heuristic provided in (2B), (2C), (1G), (1H). For full duplex small cells, condition (1D) is used. (See operation 512, FIG. 5).

Per-TTI Scheduling Decisions

According to an example implementation, the knowledge of optimum or target resource allocation may be used for scheduling the users in each subframe or TTI. For downlink scheduling from the macro eNB, downlink transmission from the macro eNB may be allocated to one of the links served by the macro eNB (e.g., one of the access links to a macro UE or one of the self-backhaul links) for each TTI. Given a fraction or portion of resources to be allocated to macro UE i ($\rho_i^*$), to the self-backhaul link to small cell k ($\rho_k^{sc*}$), to the small cell UE j of small cell k ($\rho_j^{k*}$), the macro eNB may then determine if a TTI should be given to a macro UE or to a self-backhaul link, and the small cell eNB (or micro BS) may determine the small cell UE to which allocation in a TTI should be done (e.g., determine which small cell UE should be served within that TTI, when the small cell is served by macro eNB).

According to an example implementation, macro eNB may schedule a link (e.g., one of the access links or one of the self-backhaul links) per TTI/subframe that has been served the least with respect to its target resource allocation. For example, the macro eNB determines which link to schedule (an access link or a backhaul link) based on actual resource allocation of the link so far (or over a time period) compared to the target (or optimal) resource allocation of that link. The link that has been served the least w.r.t. its target resource allocation is scheduled in a TTI, for example. In addition, the macro eNB may determine a target throughput for each small cell user device, and receive an actual throughput for each small cell user device, and the macro eNB may then schedule the small cell user device per TTI, when that small cell is scheduled, that has been served the least based on its actual throughput with respect to its target throughput.

According to an example implementation, a technique may include determining (e.g., by macro eNB/BS or macro cell) a target throughput per small cell user device for the small cell; receiving, by the macro eNB/macro BS from a micro base station for the small cell, an actual throughput for each of a plurality of the small cell user devices served by the small cell; selecting, by the macro base station based on the actual throughput for the small cell user devices, one of the small cell user devices that has been served the least based on its actual throughput with respect to the target throughput per small cell user device; and, scheduling, by the macro base station for a subframe or transmission time interval (TTI), when the self-backhaul link for the small cell is scheduled, the selected small cell user device for downlink data transmission.

According to another example implementation, a technique may include determining a portion of downlink resources allocated to an access link for each of one or more macro user devices; and determining which link, of the one or more access links and the self-backhaul link, has been served the least with respect to its target portion of downlink resources; and, scheduling for downlink data transmission, by the macro base station for a subframe or transmission time interval (TTI), the link that has been served the least with respect to its target portion of downlink resources.

According to another example implementation, a technique may include determining a portion of downlink resources allocated to each of a plurality of access links (for small cell UEs) associated with a small cell user device/small cell UE served by the small cell; determining which access link of the plurality of access links for small cell user devices/small cell UEs served by the small cell, has been served the least with respect to its target portion of downlink resources; and, scheduling, for a subframe or transmission time interval (TTI) when the self-backhaul link for the small cell is scheduled, the access link that has been served the least with respect to its target portion of downlink resources, for downlink data transmission.

Further example implementations will now be described relating to prioritizing various links.

For full-duplex self-backhauled networks (including a full-duplex small cell(s)), schedule the link that has been served least resources w.r.t. the optimum or target resource allocation(s), such as for example:

$$\text{Macro } eNB \text{ schedules the link } \min_{\forall i=1,\cdots,M, \forall k=1,\cdots,S} \left( \frac{\rho_i(t)}{\rho_i^*}, \frac{\rho_k^{sc}(t)}{\rho_k^{sc*}} \right) \quad (4A)$$

$$\text{Small cells } k \text{ schedules the link } \min_{\forall j=1,\cdots,N_k} \left( \frac{\rho_j^k(t)}{\rho_j^{k*}} \right) \quad (4B)$$

where $\rho_i(t)$, $\rho_k^{sc}(t)$, $\rho_j^k(t)$ are the IIR (Infinite impulse response) filtered value of the resource allocation so far, at TTI t.

For half-duplex self-backhauled networks (including a half-duplex small cell(s)), for each small cell k, allocation to either self-backhaul link or a small cell UE of small cell k is possible in a TTI t. Hence, the macro eNB may:

Determine which macro UE or self-backhaul link should be scheduled using (4A)

It may be assumed that the macro eNB, for instance, schedules first and informs the small cell, which then schedules its own (small cell) UEs. For example, the macro eNB may send a first message to the small cell informing the small cell of a scheduled transmission, during a first TTI, from the macro eNB to the small cell for a small cell UE. Then, the small cell may schedule, for a second or subsequent TTI, for downlink data transmission to the small cell UE, the data received from the macro eNB for the small cell UE. Thus, a small cell may receive data from macro eNB for a small cell UE during a first TTI, and then may transmit or forward this received data to the small cell UE during a subsequent TTI. This way it may be ensured that the small cell does not schedule its own UE when it is expected to receive data from the macro cell. For example, for a half duplex small cell, the small cell can either receive data over self-backhaul link, or may transmit data to a selected small cell UE, but not both during the same time period or TTI, for example; thus, for example, the small cell may receive data for one of its small cell UE during a first TTI, and then schedule for downlink transmission for a subsequent TTI, the transmission of the data to the small cell UE via access link.

If a small cell k is scheduled, then that cell does not schedule any of its UEs in this TTI (e.g., but may schedule that small cell UE in a subsequent TTI)

Otherwise, the small cell k determines which of its UEs should be scheduled using (4B)

Macro eNB's Prioritization of Small Cell UEs' Data

While scheduling a self-backhaul link k, the macro eNB may determine the small cell UE for which macro eNB should send data. Macro eNB may determine the target or optimum long term throughput $T_j^{k*}$ for each UE of small cell k as, for example:

$$T_j^{k*} = \frac{\rho_k^{sc*} R_k^{sc}}{N_k} \qquad (4C)$$

Small cell k feeds back the information on the throughput delivered for small cell UE j to the macro eNB (small cell k informs macro eNB of its actual throughput). Macro eNB determines the small cell UE to be served for a small cell k, as $$\min_{j=1\cdots N_k} \frac{T_j^k(t)}{T_j^{k*}} \qquad (4D)$$

where $T_j^k(t)$ is the IIR filtered throughput of UE j in small cell k so far, at TTI t.

Figure 6:
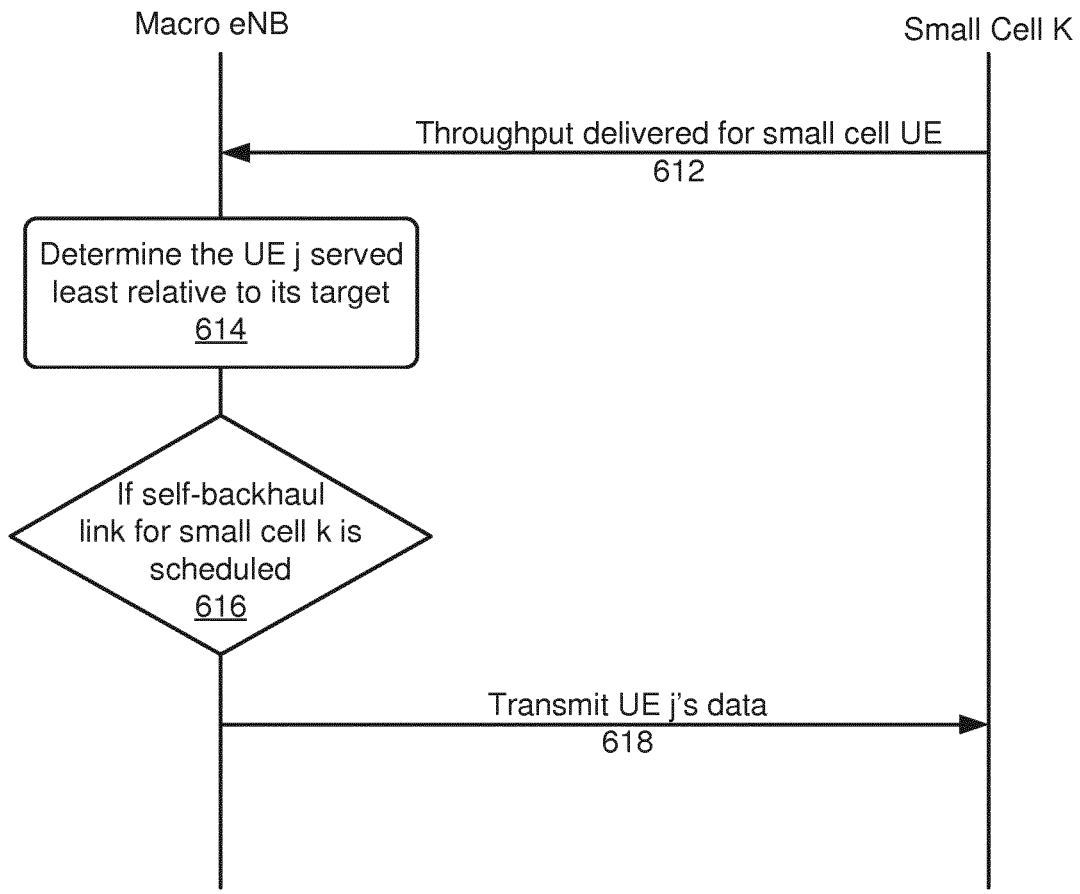
FIG. 6 is a diagram illustrating a macro eNB prioritizing and scheduling a small cell UE according to an example implementation.

FIG. 6 is a diagram illustrating a macro eNB prioritizing and scheduling a small cell UE according to an example implementation. A macro eNB may be connected to or in communication with one or more small cells/micro eNBs/BSs via a corresponding wireless self-backhaul link. In the FIG. 6, the macro eNB is in communication with and serves small cell k (and micro eNB/micro BS) via a self-backhaul link. At 612, the small cell k (or micro eNB k) reports to macro eNB the actual throughput for one or more small cell UEs served by small cell k, such as UE j. An example throughput may be determined, e.g., based on the allocated resources (quantity of resources allocated) and the data rate, such as a product of the resources times the data rate, for period of time. Although not shown, macro eNB may also determine the target throughput for each small cell UE within small cell k, for example. At 614, macro eNB may determine the UE j served the least relative to its target throughput (e.g., based on a difference between target throughput and actual throughput). For example, the small cell served the least may be the small cell UE having the largest difference between its target throughput and its actual throughput. At 616, when self-backhaul link k is scheduled, the macro eNB transmits the data for the small cell UE j that has the least throughput relative to its target throughput $T_j^{k*}$.

Yet another approach could be to transmit the data of that small cell UE in small cell k that has the least amount of data buffered in small cell k. The idea here is to provide the maximum flexibility to small cell k to schedule its users and to ensure that that small cell k does not run out of data for any of the UEs as long as the macro eNB has data for those UEs.

According to an example implementation, an apparatus includes at least one processor and at least one memory including computer instructions, when executed by the at least one processor, cause the apparatus to: allocate resources in a wireless network that includes one or more macro user devices served by a macro base station associated with a macro cell and a micro base station associated with a small cell that is served by the macro base station, the causing the apparatus to allocate resources includes causing the apparatus to: determine a portion of downlink resources allocated to a self-backhaul link between the macro base station and the micro base station for the small cell; determine that a threshold condition is exceeded with respect to the self-backhaul link for the small cell; and decrease, based on the determining, the portion of downlink resources allocated to the self-backhaul link for the small cell.

According to an example implementation of the apparatus, causing the apparatus to determine a portion of downlink resources allocated to a self-backhaul may include causing the apparatus to: determine, by the macro base station, a portion of downlink resources allocated to a self-backhaul link between the macro base station and the micro base station for the small cell based on a number of small cell user devices served by the small cell.

According to an example implementation of the apparatus, causing the apparatus to determine a portion of downlink resources allocated to a self-backhaul may include: receive, by a micro base station associated with the small cell from the macro base station, information indicating the portion of downlink resources allocated to the self-backhaul link between the macro base station and micro base station for the small cell.

According to an example implementation of the apparatus, causing the apparatus to determine a portion of downlink resources allocated to a self-backhaul link may include causing the apparatus to: determine, a portion of downlink resources allocated to a self-backhaul link for the small cell in a weighted proportion to the number of small cell user devices served by the small cell.

According to an example implementation of the apparatus, causing the apparatus to determine a portion of downlink resources allocated to a self-backhaul link may include causing the apparatus to determine a portion of downlink resources allocated to user devices based on a number of user devices served by or over each of a plurality of wireless links, including causing the apparatus to: determine, by the macro base station, a portion of downlink resources allocated to an access link for each of one or more macro user devices; and determine, by the macro base station, a portion of downlink resources allocated to a self-backhaul link for the small cell in a weighted proportion to the number of small cell user devices served by the micro base station for the small cell.

According to an example implementation of the apparatus, causing the apparatus to determine that a threshold condition is exceeded may include causing the apparatus to: determine that a sum of ratios of: 1) a data rate for the self-backhaul link for the small cell to 2) a data rate of an access link between the small cell and each of one or more small cell user devices served by the small cell, is greater than a threshold.

According to an example implementation of the apparatus, the small cell includes a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells other than the first small cell.

According to an example implementation of the apparatus, the small cell may include a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells.

According to an example implementation of the apparatus, causing the apparatus to decrease may include causing the apparatus to: decrease, by the macro base station, based on the determining, the portion of downlink resources allocated to the self-backhaul link for the small cell which frees up some of the resources that were allocated to the small cell; determine, by the macro base station, a portion of the freed up resources to be re-allocated to at least one of: an access link for one or more macro user devices served by the macro base station; and a self-backhaul link for one or more other small cells served by the macro base station.

According to an example implementation of the apparatus, the small cell may include a first small cell, and wherein causing the apparatus to determine a portion of downlink resources allocated to a self-backhaul link for a small cell may include causing the apparatus to: determine a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link.

According to an example implementation of the apparatus, the small cell may include a first small cell, wherein causing the apparatus to determine a portion of downlink resources allocated to a self-backhaul link for the first small cell may include causing the apparatus to: receive, by a macro base station from each of a plurality of small cells including the first small cell, a number of small cell user devices served by the small cell; determine a number of macro user devices served by the macro base station; and determine a portion of downlink resources allocated to a self-backhaul link for the first small cell based on the number of small cell user devices served by the first small cell, the number of small cell user devices served by all small cells that receive resources from the macro base stations, and the number of macro user devices served by the macro base station.

According to an example implementation of the apparatus, the small cell schedules an amount of data equally to each small cell user device that is served by the small cell.

According to an example implementation of the apparatus, further causing the apparatus to communicate, by the macro base station to the small cell, the portion of downlink resources allocated to the small cell.

According to an example implementation of the apparatus, further causing the apparatus to communicate, by the macro base station, data to the micro base station for a small cell user device via the resources allocated to the self-backhaul link for the small cell.

According to an example implementation of the apparatus, further causing the apparatus to receive, by the micro base station for the small cell from the macro base station, data bits via the resources allocated for the self-backhaul link for the small cell; and allocate, by the micro base station for the small cell, data bits equally among the small cell user devices served by the small cell.

According to an example implementation of the apparatus, further causing the apparatus to determine a target throughput per small cell user device for the small cell; receive, by the macro base station from the micro base station for the small cell, an actual throughput for each of a plurality of the small cell user devices served by the small cell; select, by the macro base station based on the actual throughput for the small cell user devices, one of the small cell user devices that has been served the least based on its actual throughput with respect to the target throughput per small cell user device; schedule, by the macro base station for a subframe or transmission time interval (TTI), when the self-backhaul link for the small cell is scheduled, the selected small cell user device for downlink data transmission.

According to an example implementation of the apparatus, further causing the apparatus to receive, by the macro base station from the small cell, an indication of an amount of data buffered at the small cell for each of one or more small cell user devices served by the small cell; determine the small cell user device that has the least amount of buffered data at the small cell; and, schedule for downlink data transmission, by the macro base station for a subframe or transmission time interval (TTI) when the self-backhaul link for the small cell is scheduled, the small cell user device that has the least amount of buffered data at the small cell.

According to an example implementation of the apparatus, further causing the apparatus to determine a target resource allocation for each of a plurality of links including one or more access links and the self-backhaul link; determine a portion of downlink resources allocated to an access link for each of one or more macro user devices; and determine which link, of the one or more access links and the self-backhaul link, has been served the least with respect to its target resource allocation; schedule, by the macro base station for a subframe or transmission time interval (TTI), the link that has been served the least with respect to its target resource allocation.

According to an example implementation of the apparatus, further causing the apparatus to determine a target resource allocation for each of a plurality of access of small cell user devices for the small cell; determine a portion of downlink resources allocated to each of a plurality of access links associated with a small cell user device served by the small cell; determine which access link of the plurality of access links for small cell user devices served by the small cell, has been served the least with respect to its target resource allocation; and schedule, for downlink data transmission for a subframe or transmission time interval (TTI) when the self-backhaul link for the small cell is scheduled, the access link that has been served the least with respect to its target resource allocation.

According to an example implementation of the apparatus, the small cell includes a first small cell, wherein causing the apparatus to determine a portion of downlink resources allocated to a self-backhaul link for the first small cell may include causing the apparatus to: receive, by the macro base station from each of a plurality of small cells including the first small cell, a number of small cell user devices for each of a plurality of small cells including the first small cell; determine a channel state information for an access link between the macro base station and each of a plurality of macro user devices; determine a channel state information of a self-backhaul link between the macro base station and a micro base station for each of the plurality of small cells; receive, from the small cell, channel state information of an access link for one or more small cell user devices; and determine a portion of downlink resources allocated to a self-backhaul link for the first small cell based on the number of small cell user devices served by the first small cell and at least a portion of the channel state information.

According to an example implementation of the apparatus, the small cell includes a first small cell, wherein causing the apparatus to determine a portion of downlink resources allocated to a self-backhaul link for the first small cell includes causing the apparatus to: receive, by the macro base station from each of a plurality of small cells including the first small cell, a number of small cell user devices for each of a plurality of small cells including the first small cell; and determine a portion of downlink resources allocated to a self-backhaul link for the first small cell based on the number of small cell user devices served by the first small cell and the number of small cell user devices served by one or more other small cells.

Figure 7:
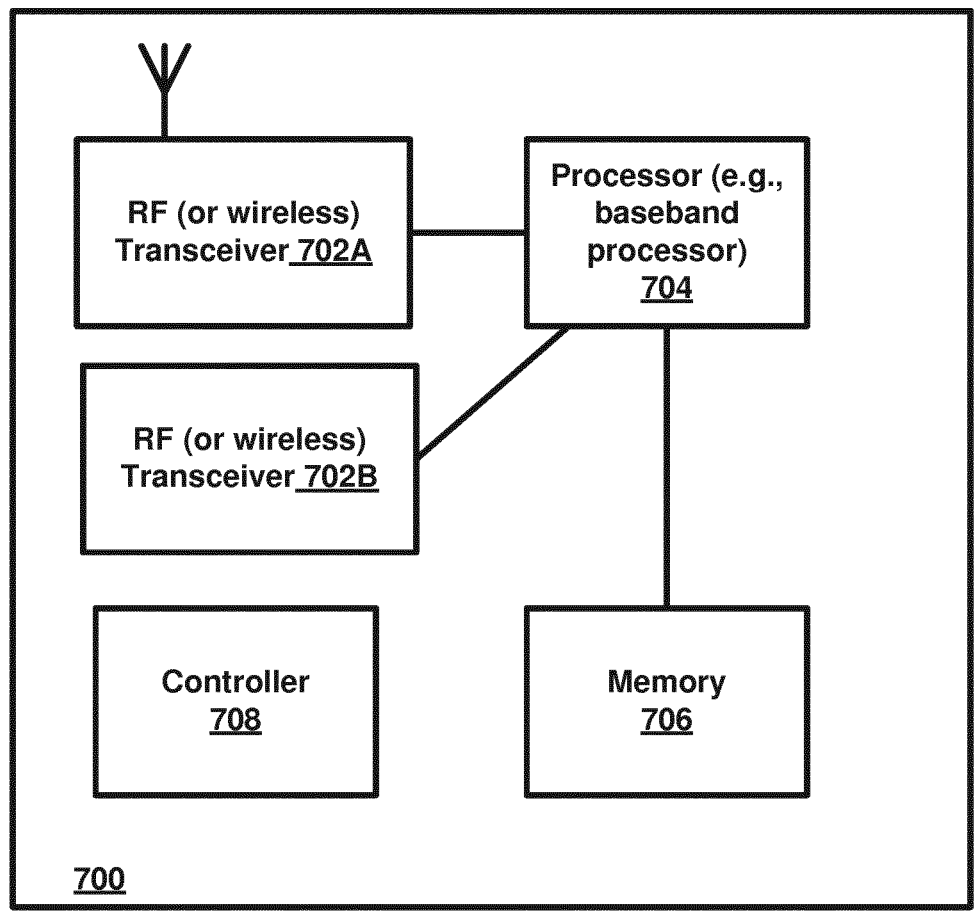
FIG. 7 is a block diagram of a node or wireless station (e.g., network device, base station/access point or mobile station/user device/UE) according to an example implementation.

FIG. 7 is a block diagram of a wireless station (e.g., AP, BS, eNB (macro or micro), UE or user device) 700 according to an example implementation. The wireless station 700 may include, for example, one or two RF (radio frequency) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of allocating resources in a wireless network that includes one or more macro user devices served by a macro base station associated with a macro cell and a micro base station associated with a small cell that is served by the macro base station, the method comprising:
    determining a portion of downlink resources allocated to a self-backhaul link between the macro base station and the micro base station for the small cell;
    determining that a threshold condition for data rates is exceeded with respect to the self-backhaul link for the small cell; and
    decreasing, based on the determining, the portion of downlink resources allocated to the self-backhaul link for the small cell.

2. The method of claim 1 wherein the determining a portion of downlink resources allocated to a self-backhaul link comprises:
    determining, by the macro base station, a portion of downlink resources allocated to a self-backhaul link between the macro base station and the micro base station for the small cell based on a number of small cell user devices served by the small cell.

3. The method of claim 1 wherein the determining a portion of downlink resources allocated to a self-backhaul link comprises:
    receiving, by a micro base station associated with the small cell from the macro base station, information indicating the portion of downlink resources allocated to the self-backhaul link between the macro base station and micro base station for the small cell.

4. The method of claim 1 wherein the determining a portion of downlink resources allocated to a self-backhaul link comprises:
   determining, a portion of downlink resources allocated to a self-backhaul link for the small cell in a weighted proportion to the number of small cell user devices served by the small cell.

5. The method of claim 1 wherein the determining a portion of downlink resources allocated to a self-backhaul link comprises determining a portion of downlink resources allocated to user devices based on a number of user devices served by or over each of a plurality of wireless links, including:
   determining, by the macro base station, a portion of downlink resources allocated to an access link for each of one or more macro user devices; and
   determining, by the macro base station, a portion of downlink resources allocated to a self-backhaul link for the small cell in a weighted proportion to the number of small cell user devices served by the micro base station for the small cell.

6. The method of claim 1 wherein the determining that a threshold condition is exceeded comprises:
   determining that a sum of ratios of: 1) a data rate for the self-backhaul link for the small cell to 2) a data rate of an access link between the small cell and each of one or more small cell user devices served by the small cell, is greater than a threshold.

7. The method of claim 6 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells other than the first small cell.

8. The method of claim 6 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells.

9. The method of claim 1 wherein the decreasing comprises:
   decreasing, by the macro base station, based on the determining, the portion of downlink resources allocated to the self-backhaul link for the small cell which frees up some of the resources that were allocated to the small cell;
   determining, by the macro base station, a portion of the freed up resources to be re-allocated to at least one of:
      an access link for one or more macro user devices served by the macro base station; and
      a self-backhaul link for one or more other small cells served by the macro base station.

10. The method of claim 1 wherein the small cell comprises a first small cell, and wherein the determining a portion of downlink resources allocated to a self-backhaul link for a small cell comprises:
   determining a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link.

11. The method of claim 1 wherein the small cell comprises a first small cell, wherein the determining a portion of downlink resources allocated to a self-backhaul link for the first small cell comprises:
   receiving, by a macro base station from each of a plurality of small cells including the first small cell, a number of small cell user devices served by the small cell;
   determining a number of macro user devices served by the macro base station; and
   determining a portion of downlink resources allocated to a self-backhaul link for the first small cell based on the number of small cell user devices served by the first small cell, the number of small cell user devices served by all small cells that receive resources from the macro base stations, and the number of macro user devices served by the macro base station.

12. The method of claim 1 wherein the small cell schedules an amount of data equally to each small cell user device that is served by the small cell.

13. The method of claim 1 and further comprising:
   communicating, by the macro base station to the small cell, the portion of downlink resources allocated to the small cell.

14. The method of claim 1 and further comprising:
   communicating, by the macro base station, data to the micro base station for a small cell user device via the resources allocated to the self-backhaul link for the small cell.

15. The method of claim 1 and further comprising:
   receiving, by the micro base station for the small cell from the macro base station, data bits via the resources allocated for the self-backhaul link for the small cell;
   allocating, by the micro base station for the small cell, data bits equally among the small cell user devices served by the small cell.

16. The method of claim 1 and further comprising:
   determining a target throughput per small cell user device for the small cell;
   receiving, by the macro base station from the micro base station for the small cell, an actual throughput for each of a plurality of the small cell user devices served by the small cell;
   selecting, by the macro base station based on the actual throughput for the small cell user devices, one of the small cell user devices that has been served the least based on its actual throughput with respect to the target throughput per small cell user device;
   scheduling, by the macro base station for a subframe or transmission time interval (TTI), when the self-backhaul link for the small cell is scheduled, the selected small cell user device for downlink data transmission.

17. The method of claim 1 and further comprising:
   receiving, by the macro base station from the small cell, an indication of an amount of data buffered at the small cell for each of one or more small cell user devices served by the small cell; and
   determining the small cell user device that has the least amount of buffered data at the small cell;
   scheduling for downlink data transmission, by the macro base station for a subframe or transmission time interval (TTI) when the self-backhaul link for the small cell is scheduled, the small cell user device that has the least amount of buffered data at the small cell.

18. The method of claim 1 and further comprising:
determining a target resource allocation for each of a plurality of links including one or more access links and the self-backhaul link;
determining a portion of downlink resources allocated to an access link for each of one or more macro user devices; and
determining which link, of the one or more access links and the self-backhaul link, has been served the least with respect to its target resource allocation;
scheduling, by the macro base station for a subframe or transmission time interval (TTI), the link that has been served the least with respect to its target resource allocation.

19. The method of claim 1 and further comprising:
determining a target resource allocation for each of a plurality of access of small cell user devices for the small cell;
determining a portion of downlink resources allocated to each of a plurality of access links associated with a small cell user device served by the small cell;
determining which access link of the plurality of access links for small cell user devices served by the small cell, has been served the least with respect to its target resource allocation; and
scheduling, for downlink data transmission for a subframe or transmission time interval (TTI) when the self-backhaul link for the small cell is scheduled, the access link that has been served the least with respect to its target resource allocation.

20. The method of claim 1 wherein the small cell comprises a first small cell, wherein the determining a portion of downlink resources allocated to a self-backhaul link for the first small cell comprises:
receiving, by the macro base station from each of a plurality of small cells including the first small cell, a number of small cell user devices for each of a plurality of small cells including the first small cell;
determining a channel state information for an access link between the macro base station and each of a plurality of macro user devices;
determining a channel state information of a self-backhaul link between the macro base station and a micro base station for each of the plurality of small cells;
receiving, from the small cell, channel state information of an access link for one or more small cell user devices; and
determining a portion of downlink resources allocated to a self-backhaul link for the first small cell based on the number of small cell user devices served by the first small cell and the channel state information.

21. The method of claim 1 wherein the small cell comprises a first small cell, wherein the determining a portion of downlink resources allocated to a self-backhaul link for the first small cell comprises:
receiving, by the macro base station from each of a plurality of small cells including the first small cell, a number of small cell user devices for each of a plurality of small cells including the first small cell; and
determining a portion of downlink resources allocated to a self-backhaul link for the first small cell based on the number of small cell user devices served by the first small cell and the number of small cell user devices served by one or more other small cells.

22. An apparatus comprising at least one processor and at least one memory including computer instructions, when executed by the at least one processor, cause the apparatus to:
allocate resources in a wireless network that includes one or more macro user devices served by a macro base station associated with a macro cell and a micro base station associated with a small cell that is served by the macro base station, including:
determine a portion of downlink resources allocated to a self-backhaul link between the macro base station and the micro base station for the small cell;
determine that a threshold condition for data rates is exceeded with respect to the self-backhaul link for the small cell; and
decrease, based on the determining, the portion of downlink resources allocated to the self-backhaul link for the small cell.

23. The apparatus of claim 22, wherein the instructions that cause the apparatus to determine a portion of downlink resources allocated to a self-backhaul link comprise instructions that cause the apparatus to:
determine, by the macro base station, a portion of downlink resources allocated to a self-backhaul link between the macro base station and the micro base station for the small cell based on a number of small cell user devices served by the small cell.

24. The apparatus of claim 22, wherein the instructions that cause the apparatus to determine a portion of downlink resources allocated to a self-backhaul link comprise instructions that cause the apparatus to:
receive, by a micro base station associated with the small cell from the macro base station, information indicating the portion of downlink resources allocated to the self-backhaul link between the macro base station and micro base station for the small cell.

25. The apparatus of claim 22, wherein the instructions that cause the apparatus to determine a portion of downlink resources allocated to a self-backhaul link comprise instructions that cause the apparatus to:
determine, a portion of downlink resources allocated to the self-backhaul link for the small cell in a weighted proportion to the number of small cell user devices served by the small cell.

26. The apparatus of claim 22, wherein the instructions that cause the apparatus to determine a portion of downlink resources allocated to a self-backhaul link comprise instructions that cause the apparatus to:
determine a portion of downlink resources allocated to user devices based on a number of user devices served by or over each of a plurality of wireless links, including:
determine, by the macro base station, a portion of downlink resources allocated to an access link for each of one or more macro user devices; and
determine, by the macro base station, a portion of downlink resources allocated to a self-backhaul link for the small cell in a weighted proportion to the number of small cell user devices served by the micro base station for the small cell.

27. The apparatus of claim 22, wherein the instructions that cause the apparatus to determine that a threshold condition is exceeded comprise instructions that cause the apparatus to:
determine that a sum of ratios of: 1) a data rate for the self-backhaul link for the small cell to 2) a data rate of an access link between the small cell and each of one or more small cell user devices served by the small cell, is greater than a threshold.

28. The apparatus of claim 27 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells other than the first small cell.

29. The apparatus of claim 27 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells.

30. The apparatus of claim 22, wherein the instructions that cause the apparatus to decrease comprises instructions that cause the apparatus to:

decrease, by the macro base station, based on the determining, the portion of downlink resources allocated to the self-backhaul link for the small cell which frees up some of the resources that were allocated to the small cell;

determine, by the macro base station, a portion of the freed up resources to be re-allocated to at least one of:
an access link for one or more macro user devices served by the macro base station; and
a self-backhaul link for one or more other small cells served by the macro base station.

31. The apparatus of claim 22, wherein the small cell comprises a first small cell, wherein the instructions that cause the apparatus to determine a portion of downlink resources allocated to a self-backhaul link for a small cell comprises instructions that cause the apparatus to:

determine a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link.

* * * * *